(12) United States Patent
Dietrich et al.

(10) Patent No.: US 7,349,601 B2
(45) Date of Patent: Mar. 25, 2008

(54) OPTICAL COUPLER

(76) Inventors: Klaus Dietrich, Fritz-Tölsch-Weg 7, A-6830 Rankweil (AT); Markus Halter, Botenaustrasse 3, CH-9443 Widnau (CH); Markus Michler, An der Nafla 15A, A-6800 Feldkirch (AT); Stephan Paredes, Friedeggstrasse 5, CH-9000 St. Gallen (CH); Andreas Walser, Gaiserau 39, CH-9056 Gais (CH)

(*) Notice: Subject to any disclaimer, the term of this patent is extended or adjusted under 35 U.S.C. 154(b) by 0 days.

(21) Appl. No.: 11/405,274

(22) Filed: Apr. 17, 2006

(65) Prior Publication Data

US 2006/0251357 A1 Nov. 9, 2006

(30) Foreign Application Priority Data

Apr. 18, 2005 (CH) .................................. 0690/05

(51) Int. Cl.
*G02B 6/26* (2006.01)
(52) U.S. Cl. ......................................... 385/39; 385/15
(58) Field of Classification Search ................ 385/15, 385/39
See application file for complete search history.

(56) References Cited

U.S. PATENT DOCUMENTS

| 4,274,706 | A  | * | 6/1981 | Tangonan ..................... 385/37 |
| 6,934,429 | B2 | * | 8/2005 | Kikuchi et al. ............... 385/14 |

* cited by examiner

*Primary Examiner*—Jennifer Doan
(74) *Attorney, Agent, or Firm*—Anthony Claiborne

(57) ABSTRACT

A coupling element (3) and a waveguide structure (4) are deposited on a common substrate (2) of an optical component (1). The coupling element (3) serves for the optical coupling of the waveguide structures (4) to a further optical component. The coupling element (3) contains a reflecting, curved surface (31.1-31.8) for deflecting and for collimation of light which propagates between the waveguide structure 4 and the further optical component. The coupling element (3) creates a standard for interfaces between the optical component (1) and a further optical component. The manufacture of the coupling element (3) is simple and inexpensive, may be standardized and directed to large batch numbers.

9 Claims, 6 Drawing Sheets

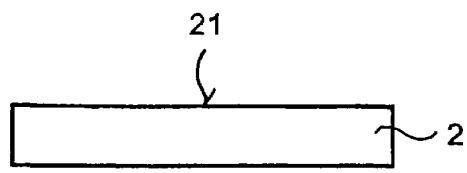
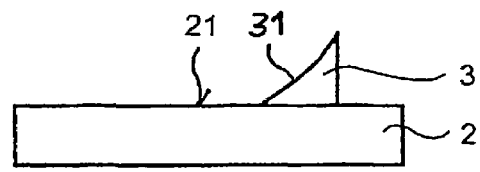
Fig. 7(a)    Fig. 7(b)
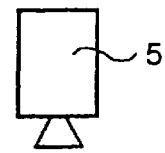
Fig. 7(c)    Fig. 7(d)
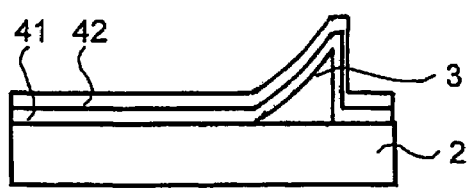
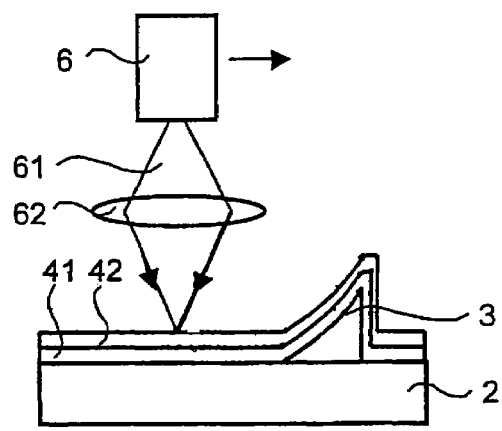
Fig. 7(e)    Fig. 7(f)
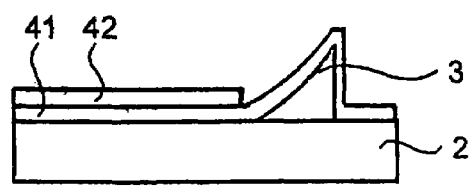
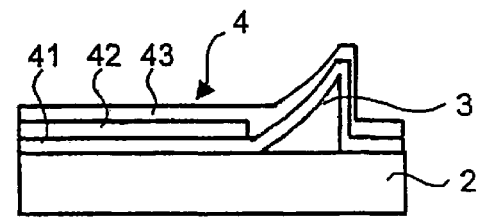
Fig. 7(g)    Fig. 7(h)

OPTICAL COUPLER

CROSS-REFERENCE TO RELATED APPLICATION

This application claims priority from Swiss patent application No. CH 00690/05, filed Apr. 18, 2005.

BACKGROUND OF THE INVENTION

1. Technical Field

The invention lies in the field of optical couplers for optical waveguides and relates to an optical component, a method for manufacturing an optical component and a method for coupling light out of a waveguide structure or into a waveguide structure, according to the preambles of the independent patent claims. The optical components according to the invention may have extensions in the region of a few centimeters to a few meters. Such optical components are mainly required for optical data transmission, and are applied for example in telecommunication, medical technology, sensor technology, in the construction of vehicles and aircraft, in technology relating to industry, buildings and control. Particularly advantageous embodiments are circuit boards which comprise electrical as well as optical structures.

2. Description of the Related Art

Optical waveguides may be manufactured by way of coating a substrate and subsequent photo-lithographic structuring of the layer. Such a manufacturing method is known for example in DE-197'32'506 A1. Accordingly, a layer of fluid, light-sensitive material, for example a UV-curable polymer is deposited on the substrate. The layer is directly written by way of an incoherent light source, in order to form the waveguide structures. The light-sensitive material is selectively exposed and cured by way of the direct writing. The coating material which has not cured is removed after the exposure has been effected. Multimode waveguides and -structures with core widths of approx. 20 µm or more may be manufactured with these methods.

For practical applications the waveguides must be coupled to other components in a low-loss manner, for example a waveguide located on an optical backplane strip to a processor board. This is effected by way of interfaces which may be designed for example as plug elements and contain suitable optical components such as coupling-in or coupling-out mirrors on the waveguide side.

A method for manufacturing waveguides with optical components is known for example from EP-0'911'658 A1. The optical components are attached on a substrate at predefined coupling-out locations, and are embedded in a waveguide layer. The waveguide structure is manufactured by way of direct writing with an incoherent light source after the deposition of the optical components on the substrate Thereafter, the coating material which is has not cured is again removed.

The exact mutual positioning of the waveguide and optical components plays a very significant role for a low-loss coupling-in and coupling-out. Even a shift by a fraction of the core width leads to a considerable reduction of the coupling efficiency, and thus to light losses. Losses of light however must be avoided in optical circuits, since they always reduce the signal-to-noise ratio at the exit. For this reason, many waveguides manufactured according to the method described in EP-0'911'658 A1 become unusable, even if one attempts to carry out the placing of the optical components and the direct writing of the waveguide structure as accurately and as reproducibly as possible. The method thus results in a high rejection rate.

Method for manufacturing optical components are known from the documents WO-000/60392 and U.S. Pat. No. 5,562,838 with which firstly optical components are deposited onto a substrate. Thereafter, positions and alignments of the optical components are measured. Strip waveguides are manufactured on the substrate in dependency on the determined positions and alignments, so that they are exactly aligned with respect to the optical components.

U.S. Pat. No. 5,832,150 discloses a coupler for glass fibers. For its manufacture, ends of a multitude of glass fibers to be coupled are fixed in a housing. The fiber ends together with an end piece of the housing are ground and polished in a manner such that an elongate, flat coupling facing and a cylindrically curved reflecting surface arises at each fiber end. The curved surface defines a line focus which lies somewhat above the coupling facing. A laser diode array may for example be introduced into the line focus. The light beam with an elliptical cross section which is emitted by a laser diode is coupled via the coupling facing into a corresponding glass fiber and is deflected as well as collimated by the cylindrical, reflecting surface, so that it propagates approximately parallel to the fiber axis in the fiber. One disadvantage of this coupler is its complicated manufacture. Furthermore, such a coupler may only be used for optical fibers which are free, but not for waveguide structures which are deposited on a substrate.

Other embodiments of such couplers also exist, but these are mostly individual solutions for certain applications. They are accordingly technically complicated and expensive in manufacture and procurement.

Objects ans Advantages

It is therefore an object of the present invention to create an optical component with an optical coupling element, wherein the optical component with the optical coupling element may preferably be able to be manufactured in a simple and inexpensive manner and with a mass production, and be suitable for many different applications.

It is furthermore the object of the invention to specify a method for the manufacture of optical components, which permits an exact, mutual positioning of the waveguide and of the coupling element. The coupling efficiency is to be optimized by way of this and the light damping in the component is to be reduced to a minimum. One strives for a production which produces as little as possible rejects.

A further object of the invention is to specify methods for coupling light out of a waveguide structure or into a waveguide structure, which may also be carried out with waveguide structures which are deposited on a substrate.

These and other objects will be apparent to those skilled in this art from the following detailed description of a preferred embodiment of the invention. These and other objects are achieved by the coupling element, the optical component, the manufacturing method and the coupling-in and coupling-out method, as defined in the independent patent claims. Advantageous embodiments are specified in the dependent patent claims.

BRIEF SUMMARY OF THE INVENTION

In contrast to U.S. Pat. No. 5,832,159, according to the invention, the coupling-in and coupling-out is spatially distinctly separated from the light deflection and light collimation. Observed with regard to time, the procedure of the coupling-out and coupling-in and the procedure of the light deflection and light collimation are exchanged with one another with respect to U.S. Pat. No. 5,832,150. By way of this, one succeeds in the coupling element being able to be manufactured without the waveguide structure to be coupled. The manufacture thus becomes simpler and less expensive. It may be standardized and directed to large batch numbers. The coupling element according to the invention may be used on a substrate with wave-guiding structures, for example strip waveguides (microstrips).

The optical component according to the invention contains a waveguide structure and a coupling element for the optical coupling of the waveguide structure to a further optical component. The waveguide structure and the coupling element are attached on a common substrate. The coupling element contains a reflecting, curved surface for the simultaneous change of the propagation direction and of the shape of the wave fronts of light which propagates between the waveguide structure and the optical components.

In the method for manufacturing the optical component according to the invention, a substrate and a coupling element according to the invention are prepared. The coupling element is deposited onto the substrate. After the deposition of the coupling element, the position of the optical element on the substrate is measured. A suitable course of a waveguide structure with respect to the position of the coupling element is determined on account the measurement. The waveguide structure is manufactured on the substrate with the determined suitable course.

In the method according to the invention, for coupling light out of a waveguide structure, the light is coupled out of the waveguide structure, is subsequently incident onto the reflecting, curved surface, and its propagation direction and the shape of its wave fronts are simultaneously changed by the curved, reflecting surface.

In the method according to the invention for coupling light into a waveguide structure, the light is incident onto the reflecting curved surface, its propagation direction and the shape of its wave fronts are simultaneously changed by the curved, reflecting surface, and the light is subsequently coupled into the waveguide structure The change of the propagation direction means a deflection of the light by way of the reflecting, curved surface preferably by approx. 90°. The change of the shape of the wavefronts may include a collimation, a focusing, the production of a divergent light beam or other influences. The invention is hereinafter explained mainly with the example of collimation without limiting its generality.

One preferred application of the invention is with components which combine electrical and optical functions with one another. For this purpose, the used substrate may be an electrical circuit board. The optical components and waveguide structures give the electrical circuit board an considerable increased value.

Concluding, one may say that the invention provides an optical interface which is characterized essentially by the following parameters:
  position of the exit spot (with respect to the plane of the substrate, thus x, y);
  dimension of the exit spot (for example approximately square with a side length of approx. 300 µm);
  intensity distribution of the exit spot (for example Gaussian)
  divergence of the exiting light beam (for example 4°)

These parameters must be known if another optical component is to be coupled onto the optical component according to the invention. The manufacturer or supplier of the other optical component does not need to concern himself with other parameters. Thus the invention creates a standard for such interfaces between two optical components and solves many problems which have existed until now. Such a standard may be of interest to a manufacturer or supplier of detectors, emitters, transmitters and/or plugs.

The term "light" in this document is to be understood as an type of electromagnetic radiation, in particular also visible light, infrared irradiation (IR) or ultraviolet irradiation (UV).

BRIEF DESCRIPTION OF THE DRAWINGS

Preferred embodiments of the invention are hereinafter explained in a detailed manner by way of the drawings. Thereby, there are schematically shown in:

FIG. 7, various steps of the manufacturing method according to the invention, in transverse sections.

DETAILED DESCRIPTION OF THE PREFERRED EMBODIMENTS

Figure 1:
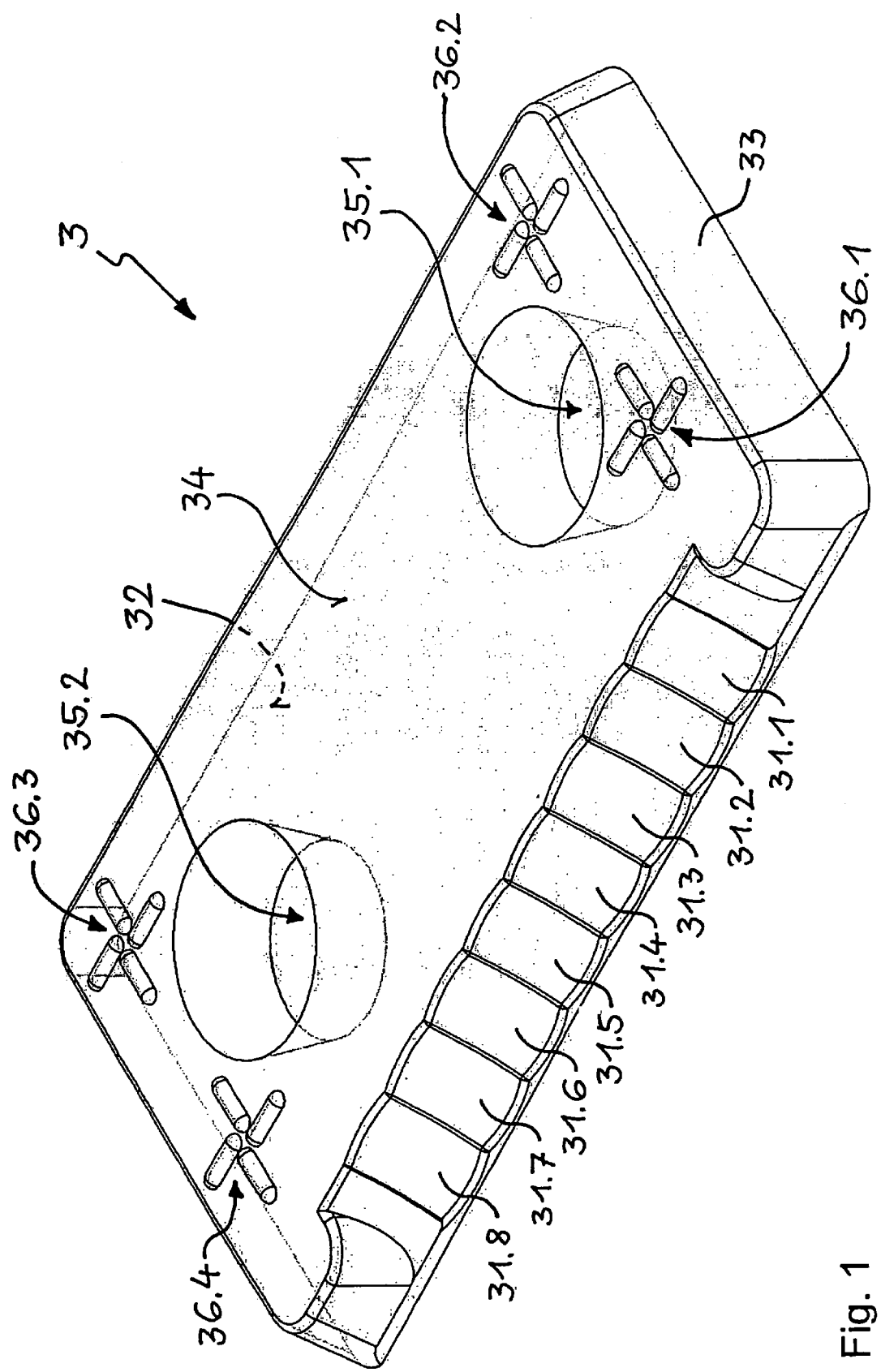
FIG. 1, a coupling element for the application in an optical component according to the invention, in a perspective view.

FIG. 1 shows a preferred embodiment of a coupling element 3 for the application in an optical component according to the invention. Thereby, it is the case of an autonomous element which may be manufactured inexpensively in large quantities. It may be manufactured for example by way of molding from a plastic capable of being injection molded, such as polycarbonate (PC), polymethylmethacrylate (PMMA) or polyetheretherketone (PEEK). Standardized components may be produced with this method in large batch numbers and with strict tolerances and at low costs. One may apply methods such as micro-embossing or micro-injection-molding, in order to manufacture structures with dimension of a few 100 µm.

The basic shape of the coupling element 3 may for example be a truncated pyramid with a rectangular base surface 32, wherein the base surface 32 may measure approx. 6 mm×3 mm and the height may amount to approx. 0.5 mm. In the embodiment example of FIG. 1, the coupling element 3 is provided with two conical through holes 35.1, 35.2 which taper towards the base surface 32. These may serve for fastening and/or positioning on the one hand the coupling element 3 on a substrate 2 (cf. FIG. 2) and/or, on the other hand, a (non-shown) further element such as a plug, on the coupling element 3. The coupling element 3 may be provided with alignment markings 36.1-36.4 which simplify an exact measurement of its position on a substrate 2 (cf. FIG. 2). Four such alignment markings 36.1-36.4 are present on the upper side 34 of the coupling element 3 in the embodiment example of FIG. 1.

The coupling element 3 contains at least one reflecting, curved surface 31.1-31.8. In order to be able to process several light channels with a single coupling element 3 (cf. FIG. 2), it is advantageous to provide several such surfaces 31.1-31.8, for example between 4 and 32 and preferably between 12 and 16. It is eight of these in the embodiment example of FIG. 1. The eight reflecting, curved surfaces 31.1-31.8 are identical to one another and are arranged next to one another in a row. Their dimensions in each case are approx. 0.5 mm×0.6 mm or less, for example approx. 0.25 mm×0.3 mm. Each reflecting, curved surface 31.1-31.8 is curved in an approximately rotational-parabolic manner. The shape and the curvature of the reflecting, curved surfaces 31.1-31.8 must be adapted to the respective application. Other shapes are of course also possible, for example cylindrical, spherical, hyperbolic, elliptical or further ones. The reflecting, curved surfaces 31.1-31.8 form a part of an outer surface, for example the peripheral surface 33, of the coupling element 3 and, seen from the outside, are concavely curved. They are essentially inclined by 45° with respect to the base surface 32 of the coupling element 3, in order to deflect light which propagates along a direction parallel to the base surface 32, in a manner such that after the deflection it propagates along a direction (cf. FIG. 5) which is essentially perpendicular to the base surface 32. The reflecting, curved surfaces 31.1-31.8, and possibly also further surface parts of the coupling element 3, have a high reflectivity of preferably more than 0.9 for the light concerned. For this purpose, they are metallically mirrored for example, with gold, silver or aluminum for example, and/or are coated with a reflecting dielectric layer or layer sequence.

Figure 2:
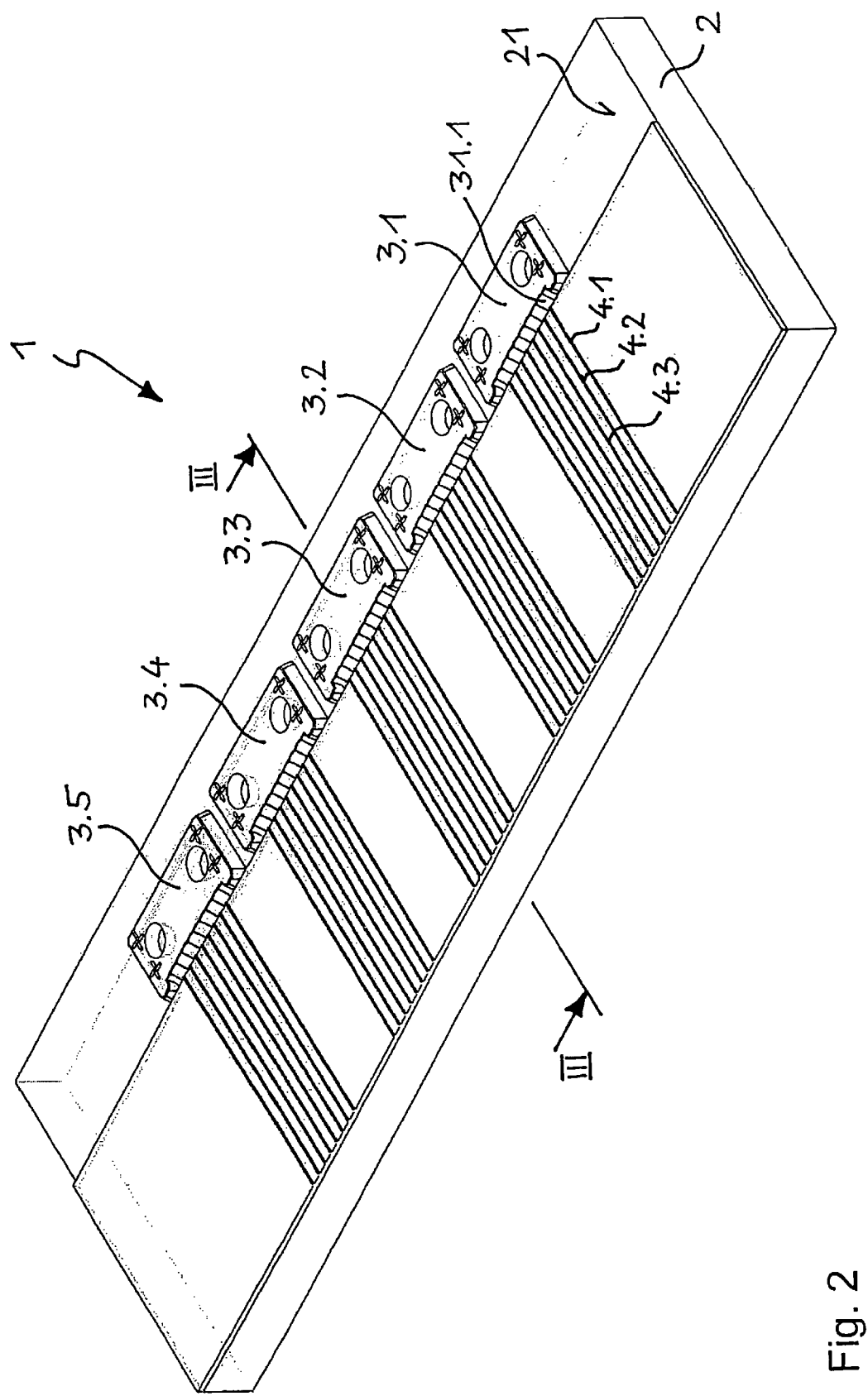
FIG. 2, a part of the optical component according to the invention, in a perspective view.

FIG. 2 shows a part of an optical component 1 according to the invention. A substrate 2 serves as a basis for the optical component 1. It may be of a metal such as glass, a semiconductor material or a plastic such as polymethyl methacrylate (PMMA) or FR4®, which is common for a light waveguide. Other less common material are also considered, for example glass-fiber reinforced resin systems such as epoxy, polyimide or PTFE (Teflon®). The substrate 2 may also be a circuit board already provided on one side, on both sides or in several layers, with electrical and/or optical strip conductors and/or components, or an inner layer or outer layer for such a circuit board.

The optical component 1 contains at least one coupling element 3.1-3.5 according to the invention. It is five of them in the embodiment example of FIG. 2. Each coupling element 3.1-3.5 is deposited over its base surface 32 (see FIG. 1) on the substrate 2, and is rigidly connected to the substrate 2, for example bonded on or soldered on.

The optical component 1 furthermore contains at least one waveguide structure 4.1, 4.2, . . . . Eight strip waveguides 4.1, 4.2, . . . parallel to one another are present per coupling element 3.1-3.5 in the embodiment example of FIG. 2, as a whole therefore 40 strip waveguides 4.1, 4.2 . . . . A reflecting, curved surface 31.1, 31.2, . . . is allocated to each strip waveguide 4.1, 4.2. A strip waveguide 4.1 and the surface 31.1. or the coupling element 3.1 which are allocated to it, are mutually arranged in a manner such that light which is coupled out of one end of the strip waveguide 4.1 is incident onto the reflecting curved surface 31.1 and is deflected and collimated by this; cf. FIG. 5. Of course, further optical, electronic, opto-electronic, mechanical and/or other elements may be located on the substrate 2 which however are not drawn in FIG. 2 for the sake of simplicity. One preferred manufacturing method for the optical component 1 is described with reference to the FIGS. 6 and 7.

Figure 3:
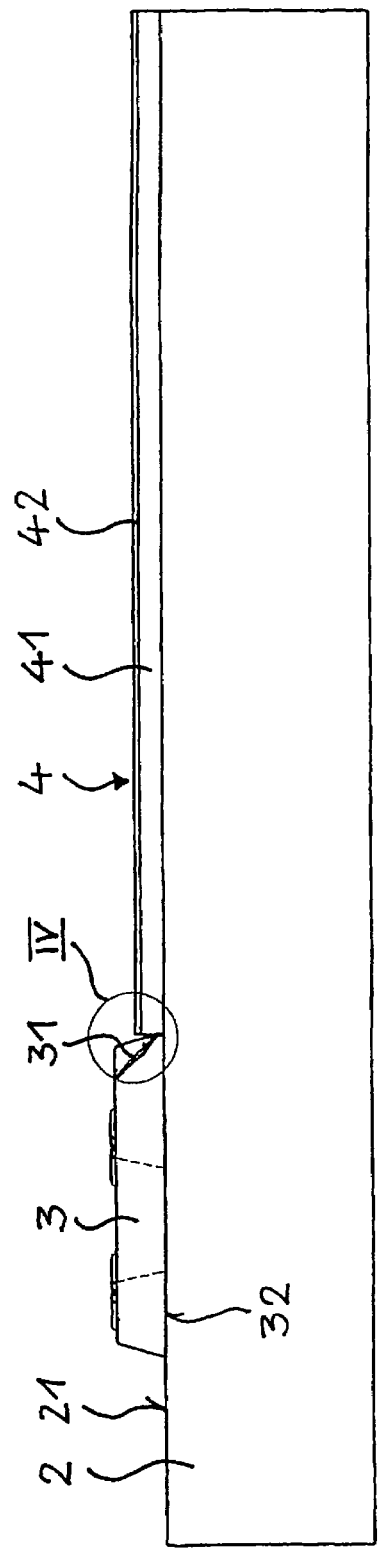
FIG. 3, a part of the optical component according to the invention, in a cross section.

FIG. 3 shows a cross section along the line III-III of FIG. 2. The elements corresponding to one another are indicated with the same reference numerals as in FIG. 2, so that they require no further explanation here. Only the numbering of the elements which are possible present in multiple is left out in FIG. 3, so that therefore the reference numeral 3 is used for the coupling element, and the reference numeral 4 for the strip waveguide.

Figure 4:
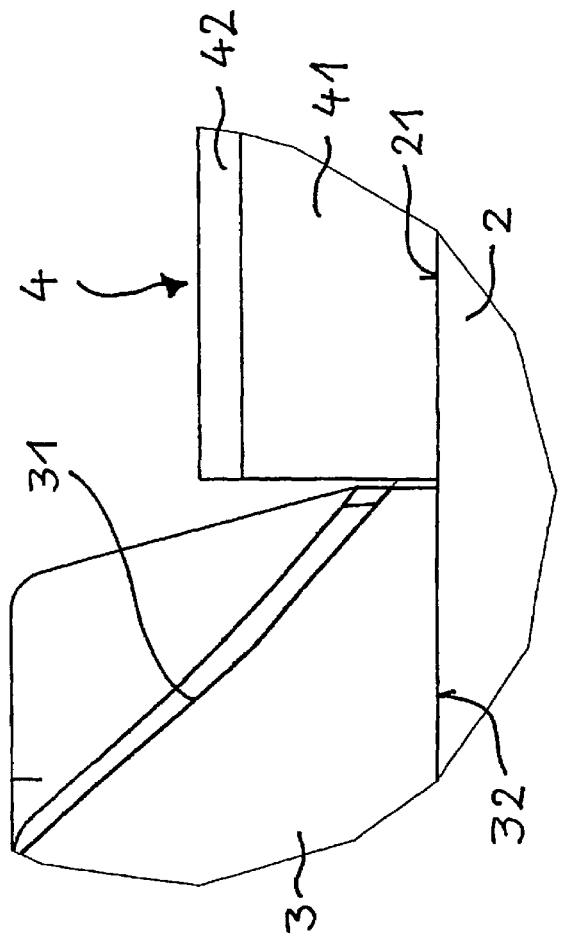
FIG. 4, an enlarged detailed view of a cutout of FIG. 3.

One coupling location, i.e. one end of a strip waveguide 4 and a part of a coupling element 3 is represented in FIG. 4 as an enlarged detailed view of the cutout IV of FIG. 3. The strip waveguide 4 in the simplified representations of the FIGS. 3 and 4 consists essentially of an underlay layer 41 deposited on the substrate 2, and of a core layer 42. In a preferred embodiment however a cover layer 43 is yet also located on the core layer 42, as FIG. 7(h) shows. The cover layer 43, as also the underlay layer 41, usually also covers the coupling element 3; cf. FIG. 7(h).

Figure 5:
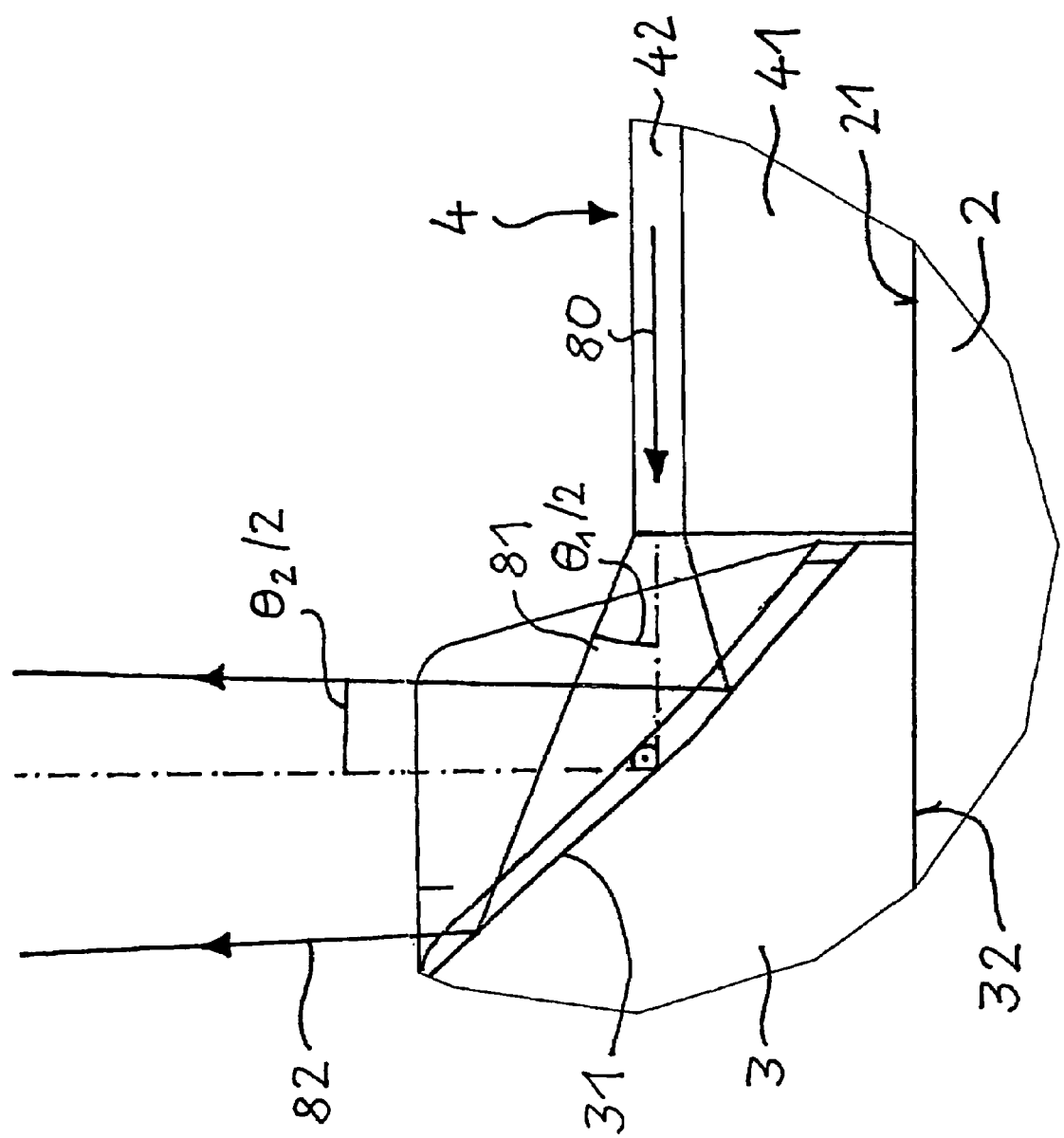
FIG. 5, a beam path in the detail view of FIG. 4.

One exemplary beam path in the coupling location of FIG. 4 is shown schematically in FIG. 5. The representation is simplified and for example does not take into account any refraction of light at transitions between the media. Light 80 is led in the strip waveguide 4. It exits out of the end of the strip waveguide 4 as light 81 with a large divergence $\theta_1/2$ of typically 19° in air or 12° in a cover layer 43 (cf. FIG. 7(h)). The reflecting, curved surface 31 in the case of a collimated exit beam 82 is arranged in the focal point of the paraboloid formed by the reflecting, curved surface 31. It is advantageous to select a paraboloid with a short focal width, so that as much as possible of the exiting light 81 is incident on the reflecting, curved surface 31, and is reflected. The deflection angle is preferably essentially 90°, so that reflected light 82 propagates away from the substrate surface 21 in a perpendicular manner. The light 81 is also collimated thanks to the curvature of the reflecting, curved surface 31, i.e. the waveguide end is imaged essentially into infinity by the reflecting, curved surface 31, or at least has an as small as possible divergence. The divergence $\theta_2/2$ of the deflected, collimated light 82 may mainly be led back to the finite extension of the core layer 42 of the waveguide 4, and may be less than 6° and preferably less than 4°. The collimated light 82 thus well approximates open beam optics. A further (not drawn) optical component, for example a plug with glass fibers or an optical component as that of FIG. 2, may be attached above the coupling element, in the region of the collimated light 82, and optically coupled to the optical component 1. The collimation of the exiting light 82 permits a large variation of a few millimeters with respect to the height of the further optical component above the substrate 2.

The beam path discussed above may of course also be the other way round with regard to time, so that incident light limited in an approximately parallel manner is coupled into the waveguide 4 by way of the reflecting, curved surface 31.

Figure 6:
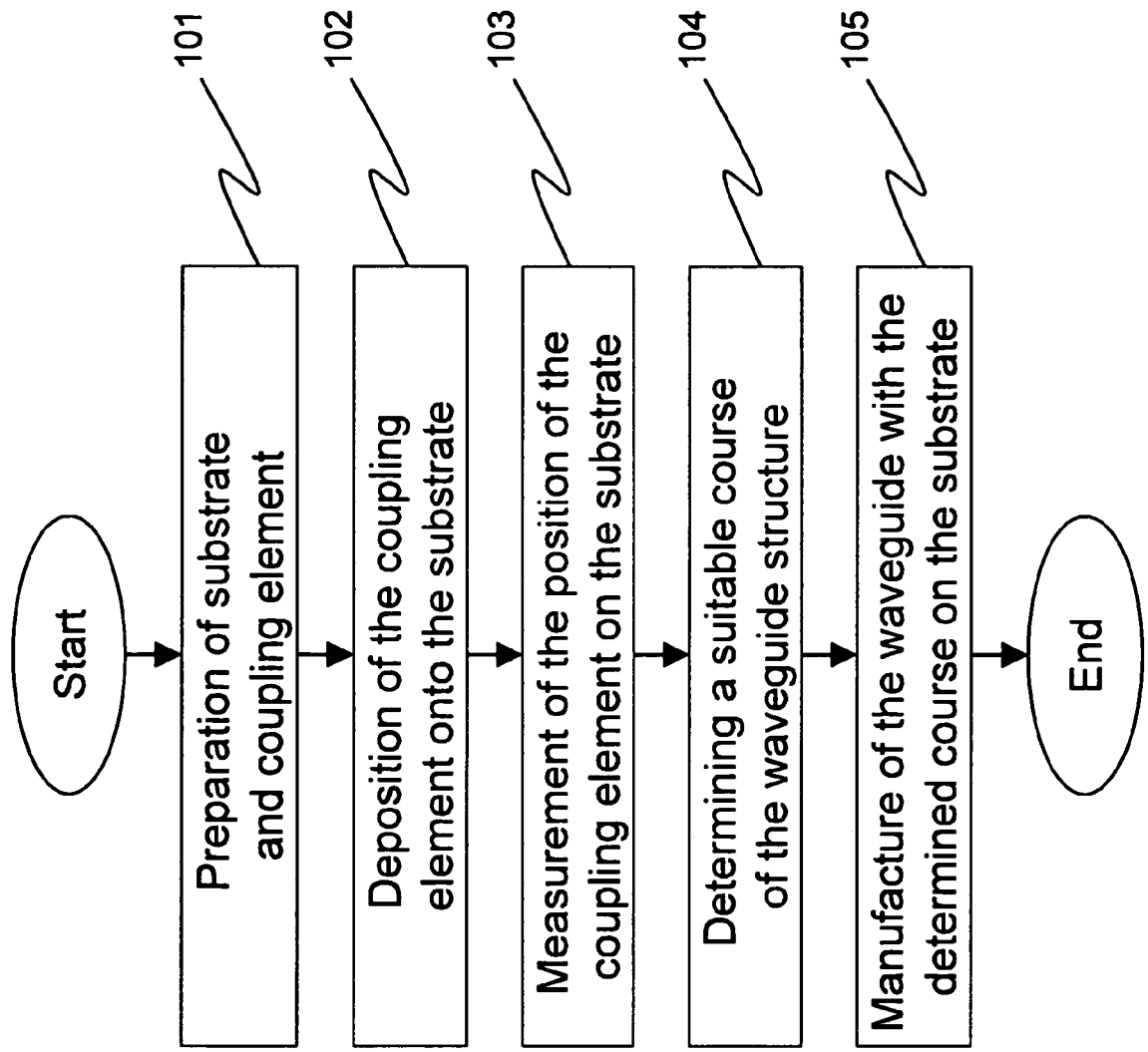
FIG. 6, a flow diagram of the manufacturing method according to the invention.

Important steps of the method according to the invention for the manufacture of an optical component are specified in the flow diagram of FIG. 6, and FIG. 7 is referred to for further details. A substrate is prepared 101. A coupling element according to the invention is deposited 102 onto the substrate. The position of the coupling element on the substrate is measured 103. An inclined course of the waveguide structure with respect to the position of the coupling element is determined 104 on account of the measurement 103. A waveguide structure is manufactured 105 on the substrate with the evaluated course.

FIG. 7 in schematic cross sections shows various steps of the method according to the invention, which are explained hereinafter.

As already mentioned, the substrate 2 is firstly prepared as is indicated in FIG. 7(a). The substrate 2 preferably has an essentially plane surface 21. Possible substrate materials were dealt with on the occasion of FIG. 2.

In a second step, according to FIG. 7(b), at least one coupling element 3 with a reflecting, curved surface 31 is deposited onto the substrate 2. The coupling element 3 here is only shown schematically. It lies with a plane base surface 32 on the plane surface 21 of the substrate 2.

The coupling element 3 may be deposited onto the substrate 2 automatically, for example by a robot (not shown)—a so-called pick-and-place unit—or manually, with or without the aid of suitable tools. In the usual case, the locations at which the coupling elements 3 are to be deposited are designated by a suitable plan. They are conveyed to the robot in electronic form or are displayed on the substrate 2 by way of markings. Mechanical positioning aids are possible, such as in the shape of grooves and projections corresponding to one another. Thanks to the method according to the invention, the positioning is not critical, i.e. may be effected in a relatively inaccurate manner. The coupling element 3 is preferably fastened on the substrate 2, for example by way of a bonding- or soldering process. The fastening should be as true to position as possible.

The whole substrate surface 21 or at least a part thereof is subsequently preferably coated with an underlay layer or lower peripheral layer 41, as FIG. 7(c) shows. The underlay layer 41 on the one hand serves for providing a smooth underlay for a waveguide core layer 42 (see FIG. 7(e)), and on the other hand for optically insulating the core layer 42 from the substrate 2, in order to prevent absorption and/or scatter of the light led in the core layer 42, by the substrate 2. The underlay layer 41 may for example be a polymer layer which may be cured by light and which is deposited onto the substrate 2 in a liquid condition. The deposition may be effected for example by way of deposition with a coating roller system Retsch, by way of spin-on with rotation, by way of the inking method or by way of spray coating technique. The optical components 3 may, but need not be co-coated. The underlay layer 41 is cured over the whole surface, for example by way of exposure with a UV lamp (not shown). Typical thicknesses of the underlay layer 41 in the cured condition lie between 10 μm and 500 μm, preferably between 50 μm and 200 μm, and for example around 100 μm. Typical indices of refraction of the underlay layer 41 for visible light lie between 1.47 and 1.57 and typically around 1.52.

FIG. 7(d) schematically shows how the position of the coupling element is measured for example by way of at least one camera 5. It is advantageous to carry out this step only after depositing the underlay layer 41, if a position change of the coupling element 3 is very improbable. The measurement step may however be alternatively effected before the deposition of the underlay layer 41 (FIG. 7(c)) or after the deposition of the core layer 42 (FIG. 7(e).

In any case, the measurement step must be effected after the deposition of the coupling element (FIG. 7(b)) and before the structuring of the waveguide structure 4 (FIG. 7(f)).

The aim of the measurement is an as accurate as possible evaluation of the position of the coupling element 3 with respect to the substrate 2 or to a fictive coordinate system which may also be allocated to the substrate. The term "position" thereby is to be understood as at least one position coordinate. In most cases however it will be necessary to measure more than one position coordinate. If it is assumed that the substrate surface 21 is a plane, the coupling element 3 may move on this plane 21 in a sliding manner and the exact shape of the coupling element 3 is known, then three degrees of freedom—are sufficient—the two Cartesian coordinates of a well defined point of the coupling element 3 in the substrate plane 21, and an angle with respect to a coordinate axis—, in order to unambiguously determine the position of the coupling element 3. If required, then one may very well measure more than only three degrees of freedom—for example in each case two Cartesian coordinates of two predefined points on the coupling element 3. As is known, the position of a body in space is unambiguously determined by six degrees of freedom. A measurement however of also more than six degrees of freedom may be useful in order by way of the thus obtained redundancy, to achieve a greater accuracy and reliability of the position measurement.

The pictures which are recorded by the camera 5 or the cameras are evaluated in order to determine the position of the coupling element 3. The evaluation may be effected manually or preferably automatically, for example by way of a digital processor (not shown). It would use method of triangulation for example. For simplifying the measurement, one may attach suitable alignment markings 36.1-36.4 on the coupling element (cf. FIG. 1) and/or on the substrate 2. This however is not absolutely necessary. Methods of optical pattern recognition may be used for the evaluation. Suitable cameras 5, triangulation methods, methods for picture evaluation and methods of optical pattern recognition are known. Known triangulation systems obtainable on the market may be used.

On account of the measurement then, with respect to the position of the at lest one coupling element 3, a suitable course of the waveguide structure to be realized is determined. "Suitable" for example means that one end of a waveguide 4 allocated to a reflecting, curved surface of the coupling element 3 (cf. FIG. 7(h)) is positioned and aligned in a manner such that an as large as possible proportion of light exiting from the waveguide 4 is incident onto the reflecting, curved surface 31, is collimated by this and thereafter propagates perpendicular to the surface of the substrate. "Suitable" may for example mean that the bending of a strip waveguide 4 running between two points is selected minimally in order to keep light losses low.

The actual waveguide layer, the core layer 42, is deposited onto the underlay layer 41 as shown in FIG. 7(e). This coating too may be effected over the whole surface or only partly. The same or other material as for the underlay layer 41 may be used for depositing the core layer 42. The core layer 42 may for example consist of a light-curable polymer. Typical thicknesses of the core layer 42 in the cured condition lie between 1 μm and 500 μm and are greatly dependent on the respective application. In order to permit the guidance of light, for the applied light, the refractive index of the core layer 42 in the cured condition must be larger than the refractive index of the underlay layer 41 (and of the cover layer 43, cf. FIG. 7(h)) in the cured condition. Typical indices of refraction of the core layer 42 for visible light lie between 1.50 and 1.60, and for example around 1.56.

The desired waveguide structure is then realized with the determined, suitable course. This may be effected for example by way of targeted partial curing and subsequent revertive development. The partial curing may be effected by way of direct writing (laser direct imaging, LDI) with a suitable light source 6, for example a UV-semiconductor laser, in the core layer 42, as is indicated in FIG. 7(f). The light 61 emitted by the light source is preferably focused onto the core layer 42 by an optical system 62. The light source 6 thereby, together with the optical system 62, is moved and guided relative to the substrate 2, for example on a (not shown) automatic precision-displacement table, whose control is effected by way of a digital processor on account of the determined waveguide course. By way of the interaction with the incident light 61, the material of the core layer 42 cures at the described locations. Suitable light sources 6 and optical systems 62 are known for focusing the light 61.

After the direct writing, the coating material which is not cured is removed or revertively developed. This may be effected for example by way of washing away with a suitable solvent, acetone for example, or with an acetone replacement product. The desired waveguide structures with the determined suitable course remains after this, as is shown in FIG. 7(*g*).

In a last step, a cover layer or upper casing layer 43 is deposited onto the structured core layer 42, and is cured if this is required. This is represented in FIG. 7(*h*). The cover layer 43 serves to protect the light-guiding core layer 42, but also the coupling element 3 from external influences such as contamination, humidity or damage, and for optically insulating it from the surroundings. The cover layer 43 may, but need not be identical to the underlay layer 41 with respect to material and geometry. Typical thicknesses of the cover layer 43 in the cured condition lie between 10 μm and 500 μm, preferably between 50 μm and 200 μm, and for example around 100 μm. Typical indices of refraction of the cover layer 43 for visible light lie between 1.47 and 1.57 and for example around 1.52. In any case, the cover layer 43 must have a smaller index of refraction than the core layer 42. The coating with the cover layer 43 may also be effected over the whole surface or only partly. For depositing and curing the cover layer 43, one may use the same means as for the underlay layer 41 or other means.

It is to be pointed out here, that the structuring of the waveguide structure 4 does not necessarily need to be effected on the core layer 42. Thus one may structure the cover layer 43 instead of the core layer 42. It is also conceivable to accordingly structure the underlay layer 41 and to leave the core layer 42 completely unstructured. The light would only be led to where an underlay layer 41 is present on account of light absorption in the substrate 2. Also several layers 41-43 of the waveguide structure 4 may be structured.

It is furthermore to be noted that the coupling element does not have to be deposited directly onto the substrate 2, but may for example be deposited onto the underlay layer 41.

Although the detailed descriptions above contain many specifics, these should not be construed as limiting the scope of the invention, but as merely providing illustrations of some of the presently preferred embodiments of this invention. Various other embodiments and ramifications are possible within its scope, a number of which are discussed in general terms above.

While the invention has been described with a certain degree of particularity, it should be recognized that elements thereof may be altered by persons skilled in the art without departing from the spirit and scope of the invention. Accordingly, the present invention is not intended to be limited to the specific forms set forth herein, but on the contrary, it is intended to cover such alternatives, modifications and equivalents as can be reasonably included within the scope of the invention. The invention is limited only by the claims and their equivalents.

LIST OF REFERENCE NUMERALS

| | |
|---|---|
| 1 | optical component |
| 2 | substrate |
| 21 | plane substrate surface |
| 3 | coupling element |
| 31 | reflecting, curved surface |
| 32 | base surface |
| 33 | peripheral surface |
| 34 | upper side |
| 35 | through holes |
| 36 | alignment markings |
| 4 | waveguide structure |
| 41 | underlay layer |
| 42 | core layer |
| 43 | cover layer |
| 5 | measurement camera |
| 6 | light source |
| 61 | light for curing |
| 62 | optical focusing system |
| 7 | collimation unit |
| 71 | adapter unit |
| 80 | guided light |
| 81 | coupled-out light |
| 82 | deflected, collimated light |
| 101 | preparation of the substrate |
| 102 | deposition of the coupling element onto the substrate |
| 103 | measurement of the position of the waveguide structure |
| 104 | evaluation of a suitable course of the waveguide structure |
| 105 | manufacture of a waveguide structure |

We claim:

1. A method for the manufacture of an optical component, the component containing a waveguide structure and at least one coupling element for the optical coupling of the waveguide structure to a further optical component, the coupling element containing a reflecting, curved surface for changing the propagation direction and the shape of the wavefronts of light, the waveguide structure and the coupling element attached on a common substrate, the method comprising:
   preparing a substrate and coupling element,
   depositing the coupling element onto the substrate,
   measuring the position of the coupling element on the substrate after depositing the coupling element,
   evaluating a suitable course of a waveguide structure with respect to the position of the optical coupling element based on the measured position and
   manufacturing the waveguide structure on the substrate with the evaluated suitable course.

2. A method according to claim 1, wherein the measurement is effected by way of at least one camera and subsequent picture processing.

3. A method according to claim 1, wherein on measurement at least one position coordinate of the coupling element is determined in a coordinate system which may be allocated to the substrate.

4. A method according to claim 1, wherein the course of the waveguide structure is evaluated in a manner such that one end of the waveguide structure allocated to the coupling element is positioned and aligned in a manner such that an as large as possible portion of light exiting from the waveguide structure is incident onto the reflecting, curved surface and is collimated by this.

5. A method according to claim 1, wherein the manufacture of the waveguide structure includes the deposition and subsequent structuring of at least one material layer.

6. A method according to claim 5, wherein the manufacture of the waveguide structure includes the deposition of an underlay layer onto the substrate, the deposition of a core layer onto the underlay layer and the deposition of a cover layer onto the core layer.

7. A method according to claim 5, wherein a light-curable layer, preferably a light-curable polymer is selected as a material layer, and the structuring of this layer is effected by way of direct writing with a light source, preferably with a UV-semiconductor laser, for the purpose of curing and subsequent revertive development.

8. A method according to claim 5, wherein the coupling element is deposited directly onto the substrate, and the at least one material layer is deposited onto the coupling element.

9. A method according to claim 1, wherein the coupling element is fastened on the substrate by one of a bonding process and a soldering process.

* * * * *